United States Patent
Ling et al.

(10) Patent No.: US 8,068,997 B2
(45) Date of Patent: Nov. 29, 2011

(54) CONTINUOUS PERFORMANCE ANALYSIS SYSTEM AND METHOD

(75) Inventors: Richard Ling, Scottsdale, AZ (US); Jan Goericke, Phoenix, AZ (US); Kevin Moeckly, Chandler, AZ (US); Andy Stramiello, Mesa, AZ (US); Larry Lee, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 12/367,182

(22) Filed: Feb. 6, 2009

(65) Prior Publication Data

US 2010/0204931 A1   Aug. 12, 2010

(51) Int. Cl.
*G01L 5/00* (2006.01)
*H03F 1/26* (2006.01)

(52) U.S. Cl. ............ 702/41; 702/189; 702/190; 702/191

(58) Field of Classification Search ............... 702/41–44, 702/72–84, 173–193
See application file for complete search history.

(56) References Cited

U.S. PATENT DOCUMENTS

| | | | |
|---|---|---|---|
| 5,018,069 A | 5/1991 | Pettigrew | |
| 6,898,540 B2 * | 5/2005 | Davies | 702/85 |
| 7,031,812 B1 | 4/2006 | Pettigrew et al. | |
| 2002/0016654 A1 | 2/2002 | Ing et al. | |
| 2004/0254747 A1 | 12/2004 | Vollum | |
| 2005/0209823 A1 | 9/2005 | Nguyen et al. | |
| 2009/0240470 A1 * | 9/2009 | Ling et al. | 702/182 |

FOREIGN PATENT DOCUMENTS

| | | |
|---|---|---|
| EP | 407179 A1 | 1/1991 |
| EP | 1420153 A2 | 5/2004 |
| GB | 2345343 A | 7/2000 |

OTHER PUBLICATIONS

EP Search Report, EP 10151852.0-1239/2221699 dated Dec. 21, 2010.
EP Office Action, EP 10151852.0-1239 dated Jan. 20, 2011.

* cited by examiner

*Primary Examiner* — Andrew Schechter
*Assistant Examiner* — Phuong Huynh
(74) *Attorney, Agent, or Firm* — Ingrassia Fisher & Lorenz, P.C.

(57) ABSTRACT

A system and method of conducting a continuous performance analysis for a system includes collecting transient performance data for a first parameter of the system and a second parameter of the system. Transfer functions are applied to the transient performance data for at least one of the first and second parameters to thereby generate phase compensated performance data representative of a steady state relationship between the first and second parameter. For each phase compensated performance datum, an estimate of the first parameter is calculated at a predetermined value of the second parameter using the phase compensated performance datum and a previously stored performance characteristic curve representative of the steady state relationship between the first and second parameters in a deterioration model extrapolation method. A very efficient binning method is used for storing phase compensated performance data and converting them into steady state performance characteristic curves of any non-linear shape.

20 Claims, 9 Drawing Sheets

CONTINUOUS PERFORMANCE ANALYSIS SYSTEM AND METHOD

TECHNICAL FIELD

The present invention generally relates to performance analysis, and more specifically to a system and method of conducting a continuous performance analysis for a system such as a gas turbine engine.

BACKGROUND

Many systems are subject to some type of performance assessment upon system start-up and initialization to determine the capability of the system to perform various functions without exceeding a limit. For example, gas turbine engines used in aerospace applications, such as helicopters, are often subject to a daily pre-flight power assurance test before beginning a mission. The purpose of the daily power assurance test is to verify the helicopter engine(s) can meet the minimum power requirements needed for its mission without exceeding the power turbine inlet temperature limit.

Typically, the daily helicopter engine power assurance test is conducted while the helicopter is hovered at a relatively low altitude, and after steady-state engine conditions have been substantially achieved. As may be appreciated, in the context of military helicopter operations, this procedure can be potentially dangerous if it is conducted in a hostile military environment, such that the helicopter can be shot down by enemy fire. This procedure may also consume significant amounts of flight time and engine life, and may thus be relatively costly. Moreover, the daily power assurance test result is only provided at the beginning of the first flight of the day. Thus, if engine performance deteriorates during a mission the pilot may not be aware until the next day, when a new daily power assurance test is conducted.

Hence, there is a need for a performance analysis system and method that can provide accurate system performance results continuously during system operation, without having to rely on potentially costly, non-useful system operation and/or placing the system in undesirable tactical situations and/or requiring that steady-state system conditions be established. The present invention addresses at least these needs.

BRIEF SUMMARY

In one embodiment, and by way of example only, a method of conducting a continuous performance analysis for a system includes collecting transient performance data for a first parameter of the system and a second parameter of the system. Transfer functions are applied to the transient performance data for at least one of the first and second parameters to thereby generate phase compensated performance data representative of a steady state relationship between the first and second parameter. For each phase compensated performance datum, an estimate of the first parameter is calculated at a predetermined value of the second parameter using the phase compensated performance datum and a previously stored performance characteristic curve representative of the steady state relationship between the first and second parameters.

In yet another embodiment, a method of conducting a continuous performance analysis for a gas turbine engine includes collecting transient performance data for a first engine parameter and a second engine parameter. Transfer functions are applied to the transient performance data for at least one of the first and second engine parameters to thereby generate phase compensated engine performance data representative of a steady state relationship between the first and second engine parameters. For each phase compensated engine performance datum, an estimate of the first engine parameter is calculated at a predetermined value of the second engine parameter using the phase compensated engine performance datum and a previously stored performance characteristic curve representative of the steady state relationship between the first and second engine parameters.

In yet another embodiment, a system a gas turbine engine continuous performance analysis system includes a first sensor, a second sensor, and a processor. The first sensor is operable to sense a first engine parameter and supply first transient performance data representative of the first engine parameter. The second sensor is operable to sense a second engine parameter and supply second transient performance data representative of the second engine parameter. The processor is coupled to receive the first and second transient performance data from the first and second sensors, respectively. The processor is operable, upon receipt thereof, to apply transfer functions to at least one of the first and second transient performance data to thereby generate phase compensated engine performance data representative of a steady state relationship between the first and second engine parameters and, for each phase compensated engine performance datum, to calculate an estimate of the first engine parameter at a predetermined value of the second engine parameter using the phase compensated engine performance datum and a previously stored performance characteristic curve representative of the steady state relationship between the first and second engine parameters.

Furthermore, other desirable features and characteristics of the inventive system and methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although various embodiments are described herein in the context of a gas turbine engine, such as may be used for helicopter propulsion engine, the embodiments may be used with gas turbine engines in various other aircraft and various other vehicles, and may also be used in conjunction with various other machines and systems, not just gas turbine engines, and in various other end-use environments.

Figure 1:
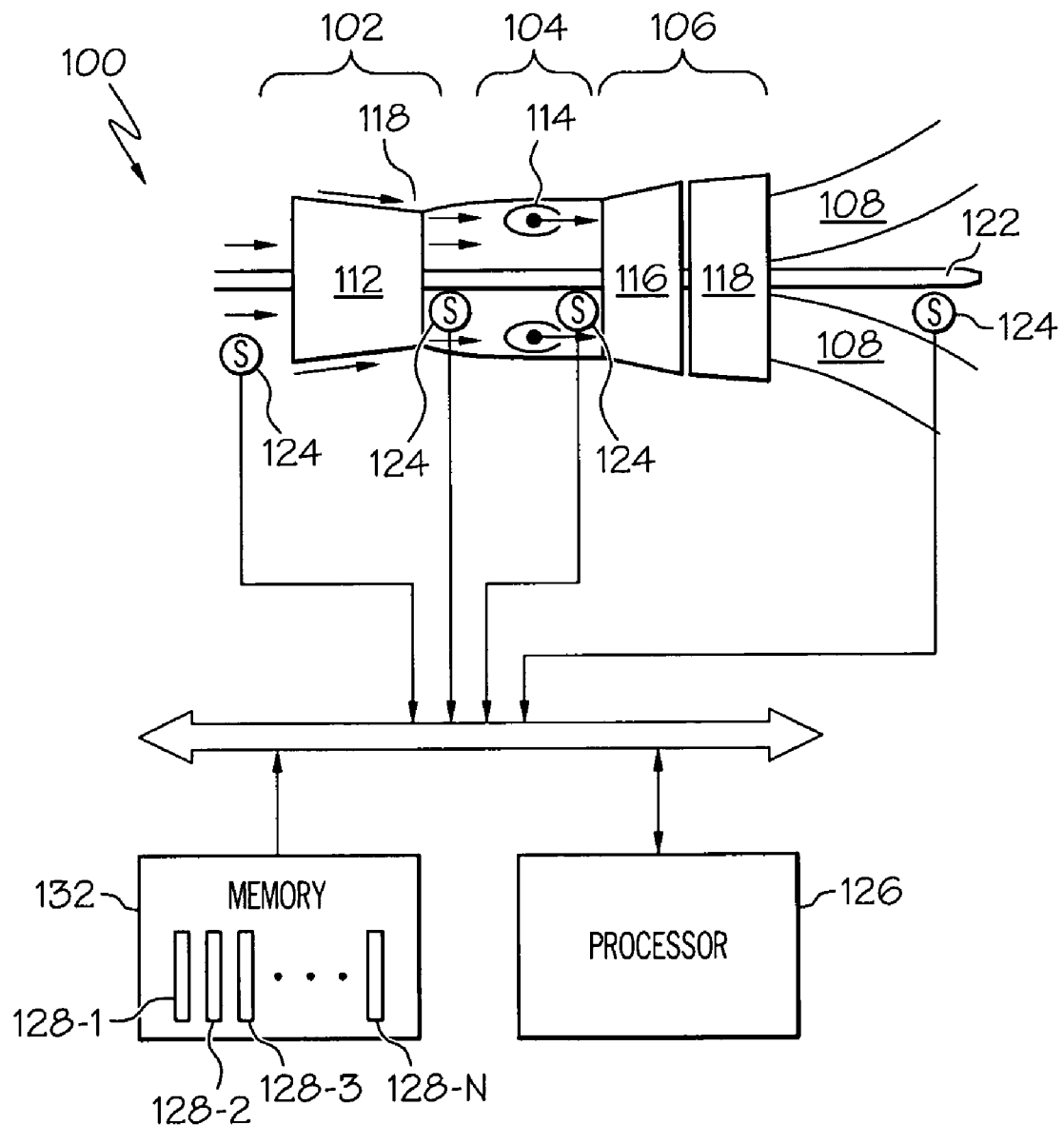
FIG. 1 is a functional block diagram of an exemplary gas turbine engine system.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102 draws air into the intake section 102 and accelerates it. The compressor section 102, may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air is directed into the combustion section 106. In the combustion section 104, which includes a combustor assembly 114, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a high pressure turbine 116 and a free power turbine 118. However, it will be appreciated that the engine 100 could be configured with more or less than this number of turbines. No matter the particular number, the combusted air mixture from the combustion section 104 expands through each turbine 116, 118, causing it to rotate a power shaft 122. The combusted air mixture is then exhausted via the exhaust section 112. The power shaft 122 may be used to drive various devices within the engine or vehicle. For example, in the context of a helicopter, the power shaft may be used to drive one or more rotors.

As FIG. 1 further depicts, a plurality of sensors 124 may be disposed in or near the engine 100. Each of the sensors 124 is coupled to a processor 126 and is operable to sense an engine parameter and supply performance data representative of the sensed parameter to the processor 126. It will be appreciated that the particular number, type, and location of each sensor 124 may vary. It will additionally be appreciated that the number and types of performance data supplied by the sensors 124 may vary depending, for example, on the particular engine type and/or configuration. In the depicted embodiment, however, at least a subset of the depicted sensors 124 supply performance data representative of, or that may be used to determine, engine inlet pressure, engine inlet temperature, engine speed, fuel flow, compressor discharge pressure, power turbine inlet temperature, engine torque, shaft horsepower, and thrust, to name just a few.

No matter the specific number and types of performance data, these data are supplied to the processor 126. The performance data supplied to the processor 126 are used to conduct a performance analysis of the engine 100. It will be appreciated that the performance analysis is preferably conducted continuously in real-time, while the engine 100 is operating. The processor 126, which may be implemented using one or more suitable general purpose microprocessors, may be part of one or more systems or devices installed within an aircraft, such as an engine control unit (ECU), a prognostic health monitoring system (PHMS), or a health utilization and monitoring system (HUMS), just to name a few, or it may be a stand-alone device.

Regardless of the specific location and implementation of the processor 126, it is configured to conduct a continuous performance analysis of the engine 100 using the performance data supplied from the sensors 124. The continuous performance analysis that the processor 126 conducts is accurate regardless of whether the collected performance data are steady state data or transient data. This is because the processor 126 is further configured to generate, using transient performance data, data that are representative of steady state performance data, which may then be used in subsequent portions of the continuous performance analysis. The method that the processor 126 implements to conduct the continuous performance analysis is depicted as a process diagram in FIG. 2, and with reference thereto will now be described.

The processor 126, in implementing the depicted method 200, retrieves at least a portion of the engine performance data that are collected during, for example, the flight of the aircraft in which the engine 100 is installed. In the depicted embodiment, the processor 126 then corrects the performance data for the ambient conditions 202 at the time the data were collected by applying what are generally referred to as the theta correction (θ-correction) and the delta correction (δ-correction). As is generally known, the θ-correction is an ambient temperature correction factor, and the δ-correction is an ambient pressure correction factor. It will be appreciated that application of the ambient condition corrections is merely preferred, and need not be implemented if so desired.

Once the performance data are retrieved and, at least in the preferred embodiment, corrected for ambient conditions, the processor 126 then selects two of engine performance parameters, and generates phase compensated performance data that are representative of a steady state relationship between the selected engine parameters 204. It will be appreciated that the engine performance parameters that are selected may vary and may be selected based on the type of performance relationship that is desired to be analyzed. In the depicted embodiment, it is desired to conduct a continuous power assurance analysis of the engine 100. As such, the performance data for engine torque (Q) and power turbine inlet temperature (T45) are selected. Of course, various other pairs of parameters may be selected to conduct various other types of performance analysis of the engine 100.

Figure 3:
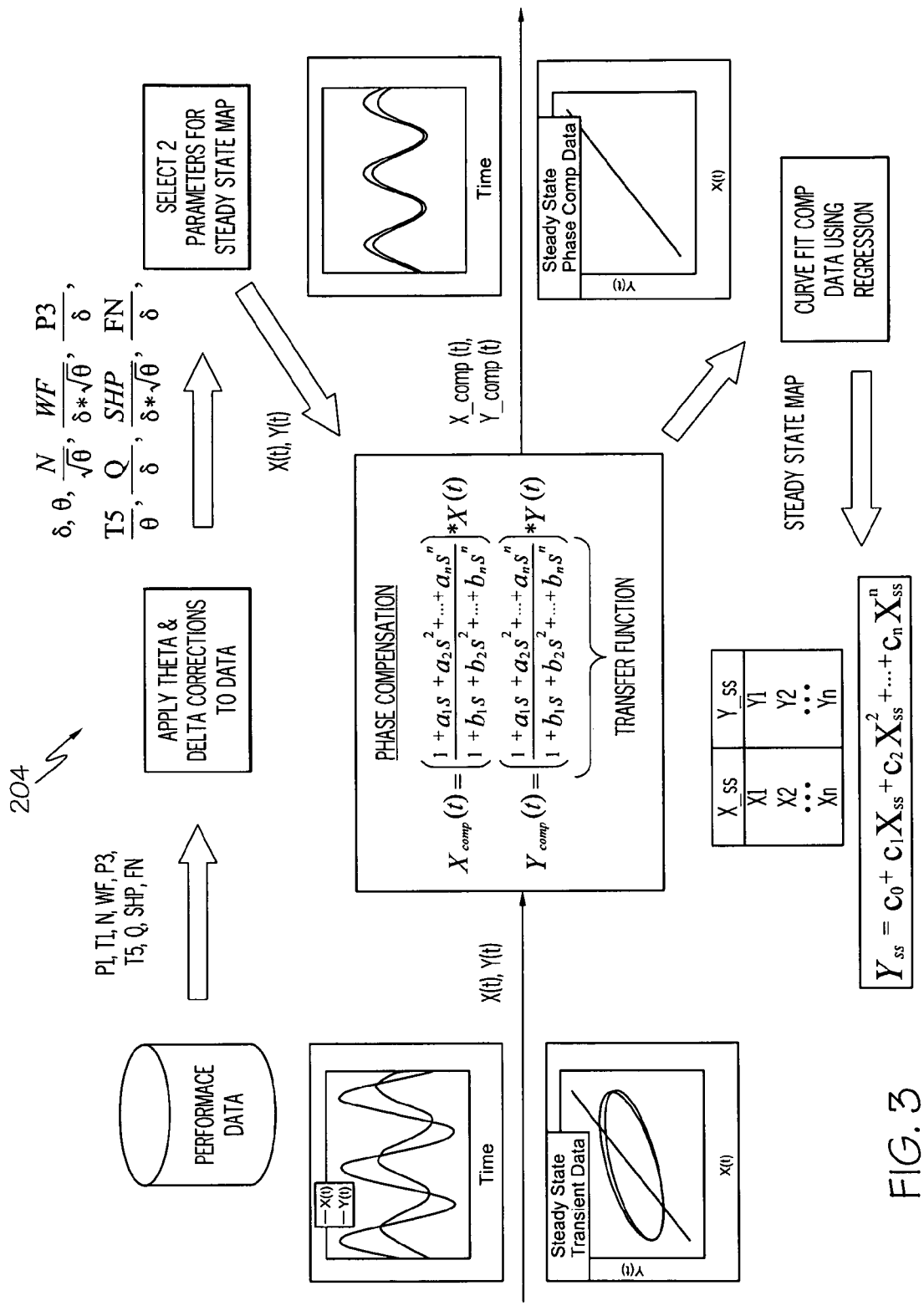
FIG. 3 depicts a process diagram of an exemplary method that may be implemented as part of the method depicted in FIG. 2 to generate phase compensated performance data.

Before proceeding further, it is noted that the methodology used to generate the phase compensated performance data 204 is depicted in FIG. 3 of the instant application, and is described in U.S. patent application Ser. No. 12/053,994, which was filed Mar. 24, 2008, and is entitled, "Transient Performance Data Phase Compensation System and Method." That application, which is assigned to the Assignee of the present application, and shares a common inventor, is hereby incorporated by reference.

Figure 2:
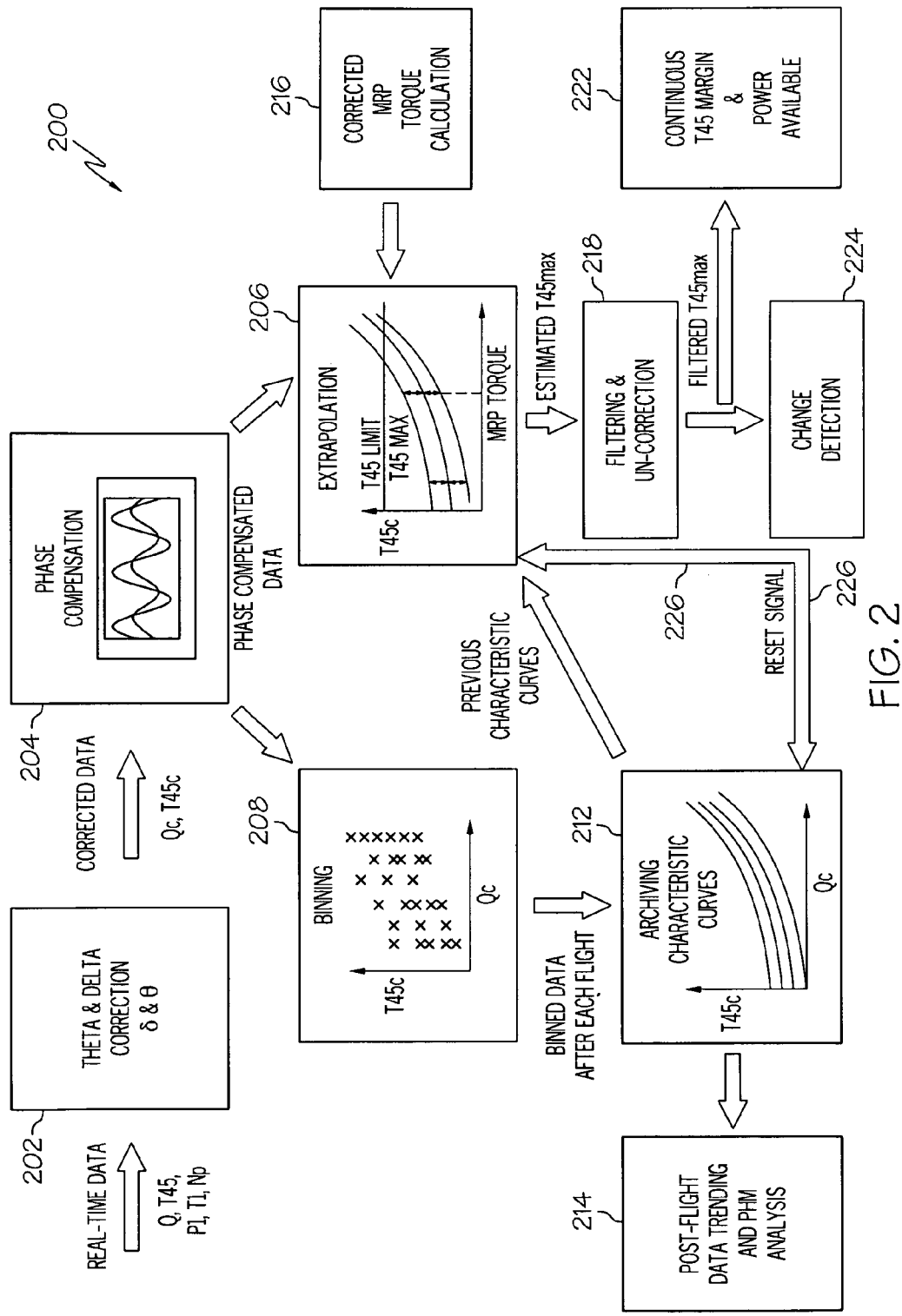
FIG. 2 depicts a process diagram of an exemplary method that may be implemented by the exemplary gas turbine engine system of FIG. 1 to conduct a continuous performance analysis.

Returning now to a description of the methodology depicted in FIG. 2, it is seen that the phase compensated engine performance data are supplied to two separate processes, represented by blocks 206 and 208. In one process 206, the processor 126, for each phase compensated engine performance datum, calculates, continuously and in real-time, an estimate of one engine performance parameter at a predetermined value of another engine performance parameter using each phase compensated engine performance datum and a previously stored performance characteristic curve representative of the steady state relationship between the two engine performance parameters. As noted above, since it is desired to conduct a continuous power assurance analysis of the engine 100, for each phase compensated performance datum of power turbine inlet temperature (T45) and engine torque (Qc), the processor calculates an estimate of power turbine inlet temperature margin and power available. This block 206 is labeled "Extrapolation" because, as will be described in more detail further below, the calculations are extrapolation-type calculations.

The other process 208 that receives the phase compensated engine performance data is a binning process. During the binning process 208, the phase compensated performance data are stored in data storage bins. More specifically, and with quick reference back to FIG. 1, a predetermined number of data storage bins 128 (e.g., 128-1, 128-2, 128-3, . . . , 128-N) are provided in memory 132. The number of data storage bins 128 may vary, but each is representative of a predefined value range of the second engine performance parameter. With reference once again to FIG. 2, and as was mentioned above, in the depicted embodiment the first engine performance parameter is power turbine inlet temperature (T45) and the second engine performance parameter is engine torque (Qc). Thus, each data storage bin 128 is representative of a predefined value range of engine torque (Qc). While the predefined value range, and hence the number of data storage bins, may vary, in one particular embodiment, in which engine torque (Qc) may vary from 1% to 130%, the predefined value range is 1%, thereby resulting in 130 storage bins 128 being provided.

No matter the specific number of data storage bins 128 provided, each is used to store the phase compensated engine performance data. The phase compensated engine performance data are not cumulatively stored in the storage bins 128 over the life of the gas turbine engine 100. Rather, the phase compensated engine performance data are stored during an operational cycle of the engine 100. For example, in the case where the engine 100 is installed in a helicopter, the phase compensated engine performance data are stored in the storage bins 128 during each flight. It is noted that older sets of stored engine performance data (also referred to herein as "binned data") may be stored until the mean values exceed those of the last flight by a predetermined amount (e.g., 10° F.) or a maximum number of stored bin sets is reached.

As FIG. 2 depicts, after each flight the phase compensated engine performance data stored during that flight are used to generate a performance characteristic curve representative of the steady state relationship between the first and second engine parameters, referred to herein as an empirical deterioration model 212. In the depicted embodiment, the binned data are used to generate a performance characteristic curve representative of the steady state relationship between power turbine inlet temperature (T45) and engine torque (Qc). As will be described further below, this performance characteristic curve 212 is used during the next flight. The performance characteristic/empirical deterioration models may also be used in various post-flight data trending analyses and/or various prognostic health monitoring (PHM) analyses 214. It should be noted that during a flight, as each new phase compensated engine performance datum (e.g., T45) is stored within its appropriate bin 128, the mean and standard deviation of that storage bin 128 are recursively calculated and stored. The mean value of each bin 128 represents a data point in the performance characteristic curve, and the standard deviation indicates the variability of data values in each bin 128. After the mean and standard deviation are updated and stored for a new data point, the raw data is preferably discarded in order to reduce data memory requirements. Moreover, if there are any unfilled bins 128 following a flight, those unfilled bins are preferably filled by extrapolation of the filled bins, consistent with the extrapolation methodology that is described further below.

The above-described binning method of storing phase compensated engine performance data is used for various reasons. First, using storage bins 128 instead of equations for storing characteristic curve data provides more flexibility to store any curve shape. Using a relatively large number of bins 128, each representative of a predetermined range value (e.g., 1%), allows for the use of simple integer round-off methods when assigning each phase compensated engine performance datum to a bin 128, and results in the data within each bin having consistent characteristics. Additionally, the phase compensation methodology 202 provides a relatively large amount of substantially continuous data to fill a larger range of storage bins 128.

Returning again to the description of the continuous performance analysis methodology 200, as was mentioned previously, estimates of power turbine inlet temperature margin and power available 206 are calculated during the current flight using performance characteristic curves from previous flights. In particular, performance characteristic curves from previously flights are used as a reference for determining relative shifts in power turbine inlet temperature (T45) at maximum rated power (MRP) torque. As is generally known, MRP torque is the torque value at which the power turbine inlet temperature margin is calculated, and is also the maximum torque value specified by the engine manufacturer for safe engine operation. This methodology is referred to herein as the deterioration model extrapolation method, and with reference to FIG. 4, a more detailed description of the deterioration model method will be described. Before doing so, however, it is also seen in FIG. 2 that a corrected MRP torque is also calculated 216 and used in the deterioration model extrapolation method. This corrected MRP torque calculation is carried out in accordance with conventional calculation methods and, as block 216 indicates, includes the theta correction ($\theta$-correction) and the delta correction ($\delta$-correction).

Figure 4:
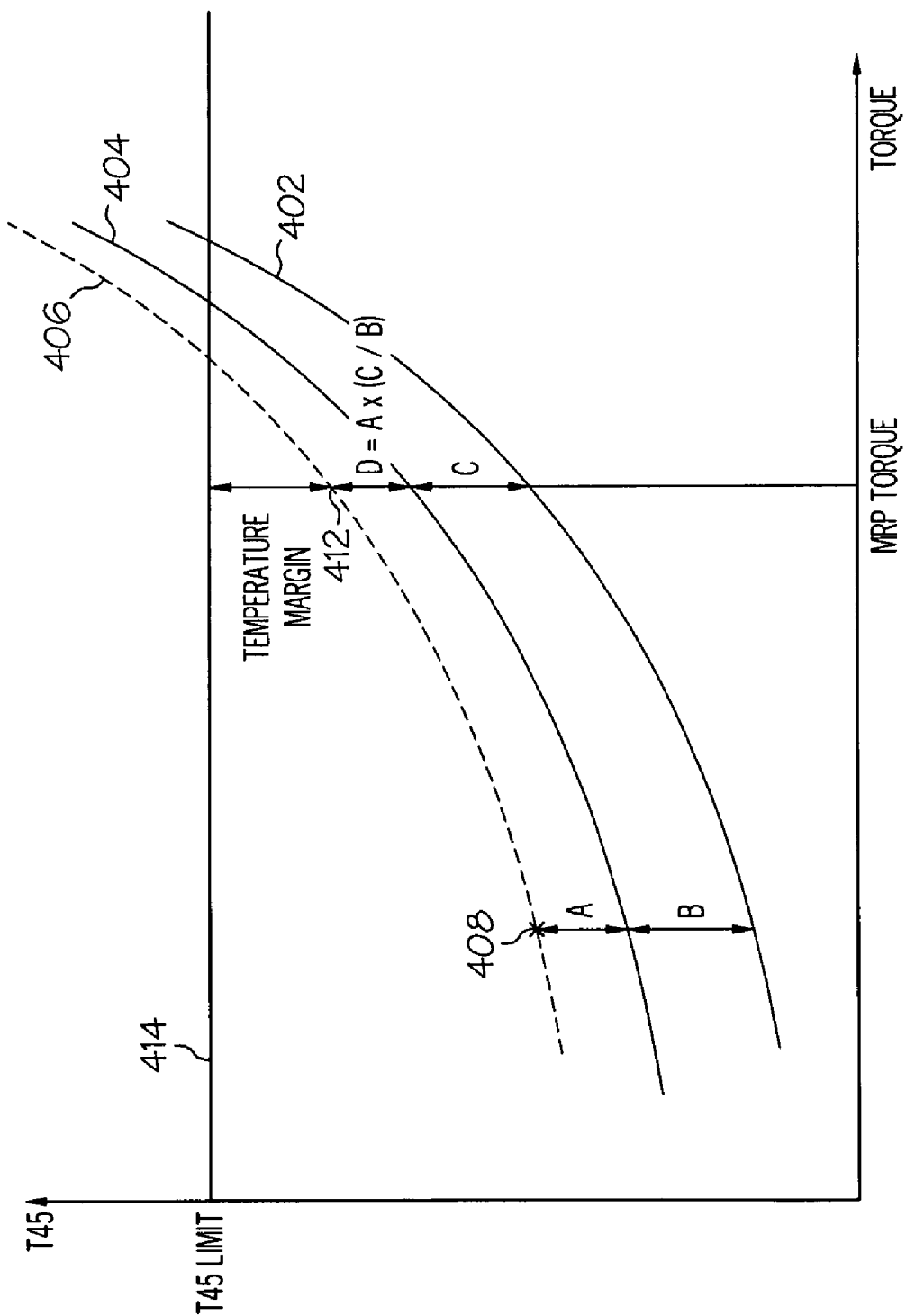
FIG. 4 depicts three performance characteristic curves to illustrate the deterioration model extrapolation methodology implemented as part of the method depicted in FIG. 2.

Turning now to FIG. 4, three performance characteristic curves are depicted, two are depicted using solid lines and the third is depicted using a dotted line. The first solid-line curve 402 is the characteristic curve from an older flight and the second solid-line curve 404 is the characteristic curve from the last flight. The older flight is preferably the flight previous to the last flight, but could be an older flight. For example, the characteristic curves 402, 404 are preferably, though not necessarily, selected from flights having the same (or at least similar) environmental characteristics. That is, if the engine 100 is used in a helicopter located in a desert environment, it is preferable to use characteristic curves 402, 404 that were generated in that same desert environment and under generally identical environmental conditions.

The dotted-line curve 406 represents the extrapolated curve for the current flight and for the presently supplied phase compensated engine performance datum 408. It is seen that extrapolation is performed based on the shape and relative spacing of the previous performance characteristic curves 402, 404 of the same engine 100. More specifically, in the depicted example the new phase compensated engine performance datum 408 (e.g., new T45) is spaced from the characteristic curve of the last flight 404 by a magnitude "A," and the characteristic curve of the last flight 404 is spaced from the characteristic curve of the previous flight 402 by a magnitude "B." Also, at the MRP torque calculated for the present flight, the characteristic curve of the last flight 404 is spaced from the characteristic curve of the previous flight 402 by a magnitude "C." Hence, the power turbine inlet temperature at the MRP torque (T45_MAX) 412 is determined by spacing the curve of the previous flight an amount "D" via extrapolation, as follows:

$$D=A(C/B).$$

In some embodiments, the data that are used for extrapolation may be limited. For example, when the system is the gas turbine engine 100 the data used for extrapolation may be limited to certain engine operational conditions. In a particular preferred embodiment, the data used for extrapolation may be limited to phase compensated engine performance data when power turbine speed (Np) exceeds a predetermined percent speed and when power turbine torque (Qc) exceeds a predetermined percent torque. The specific values of power turbine speed and torque may vary, but in one particular embodiment these values are 95% and 40%, respectively.

Whether or not the phase compensated engine performance data used for extrapolation are limited, it may also be seen in FIG. 4 that an estimate of the power turbine inlet temperature margin (T45 Margin) is also calculated 206. That is, the gas turbine engine 100 has a pre-established power turbine inlet temperature limit (T45 Limit), which is labeled as curve 414 in FIG. 4. It may thus be appreciated that the T45 Margin is the mathematical difference between the T45 Limit and the calculated estimate of T45_MAX 412.

It was noted above, when describing the binning method of storing phase compensated performance data that any unfilled bins are preferably filled by extrapolation of the filled bins. This extrapolation is conducted identical to the extrapolation methodology that was just described for calculating the estimates of T45_MAX.

Figure 5A:
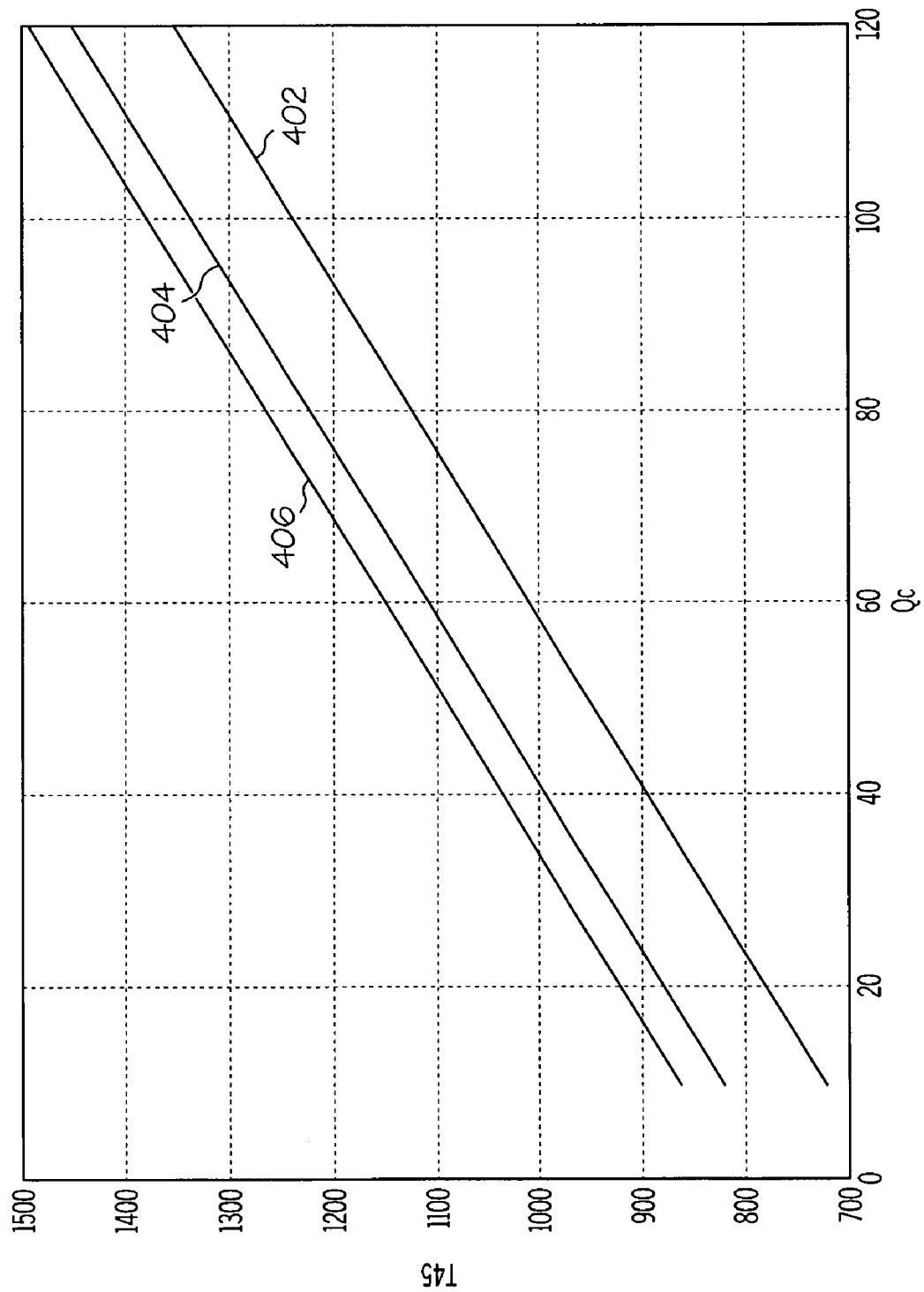
FIGS. 5A-5D depict some examples of different characteristic curves, similar to those depicted in FIG. 4, for different engine (or system) deterioration characteristics.
Figure 5B:
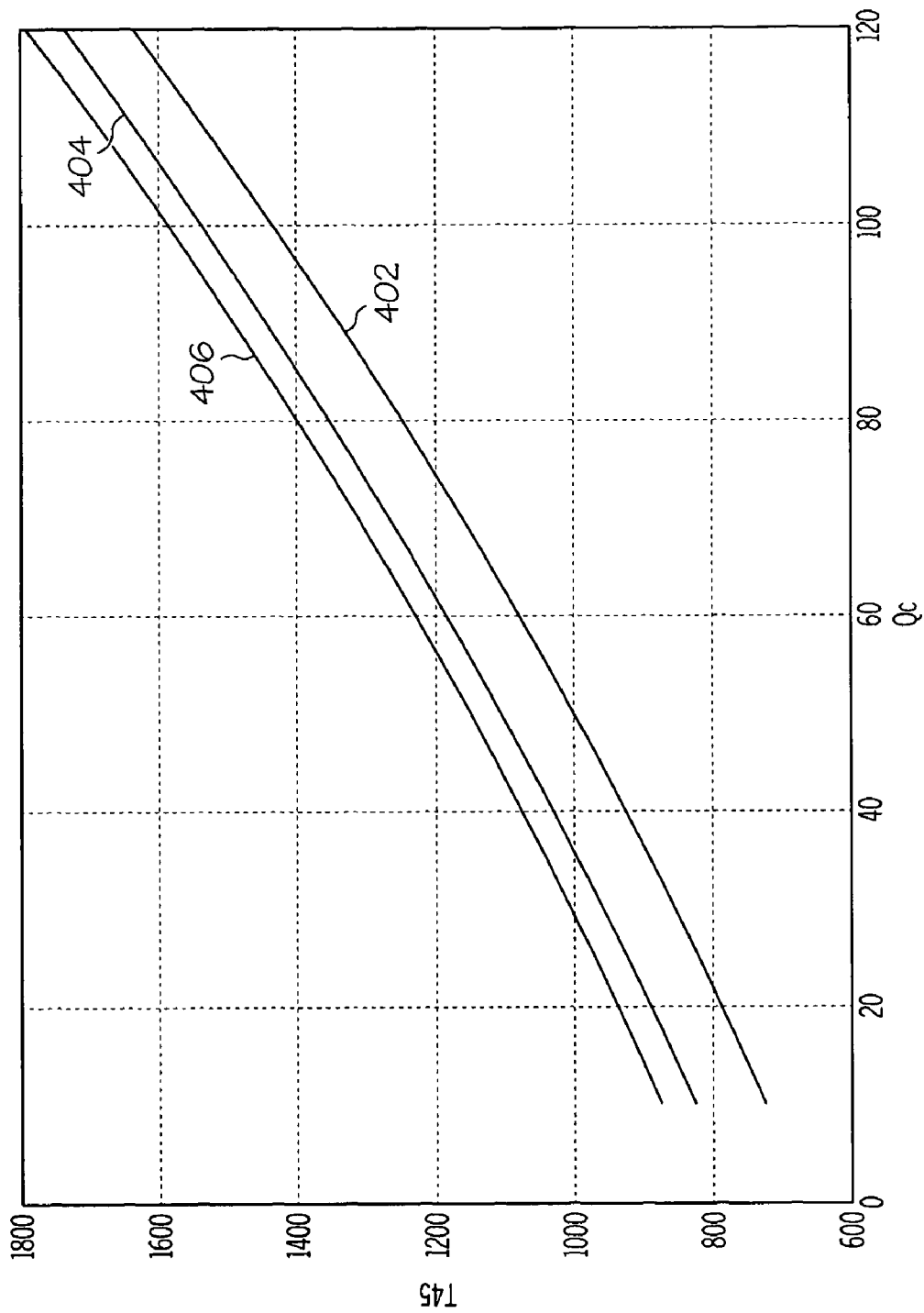
Figure 5C:
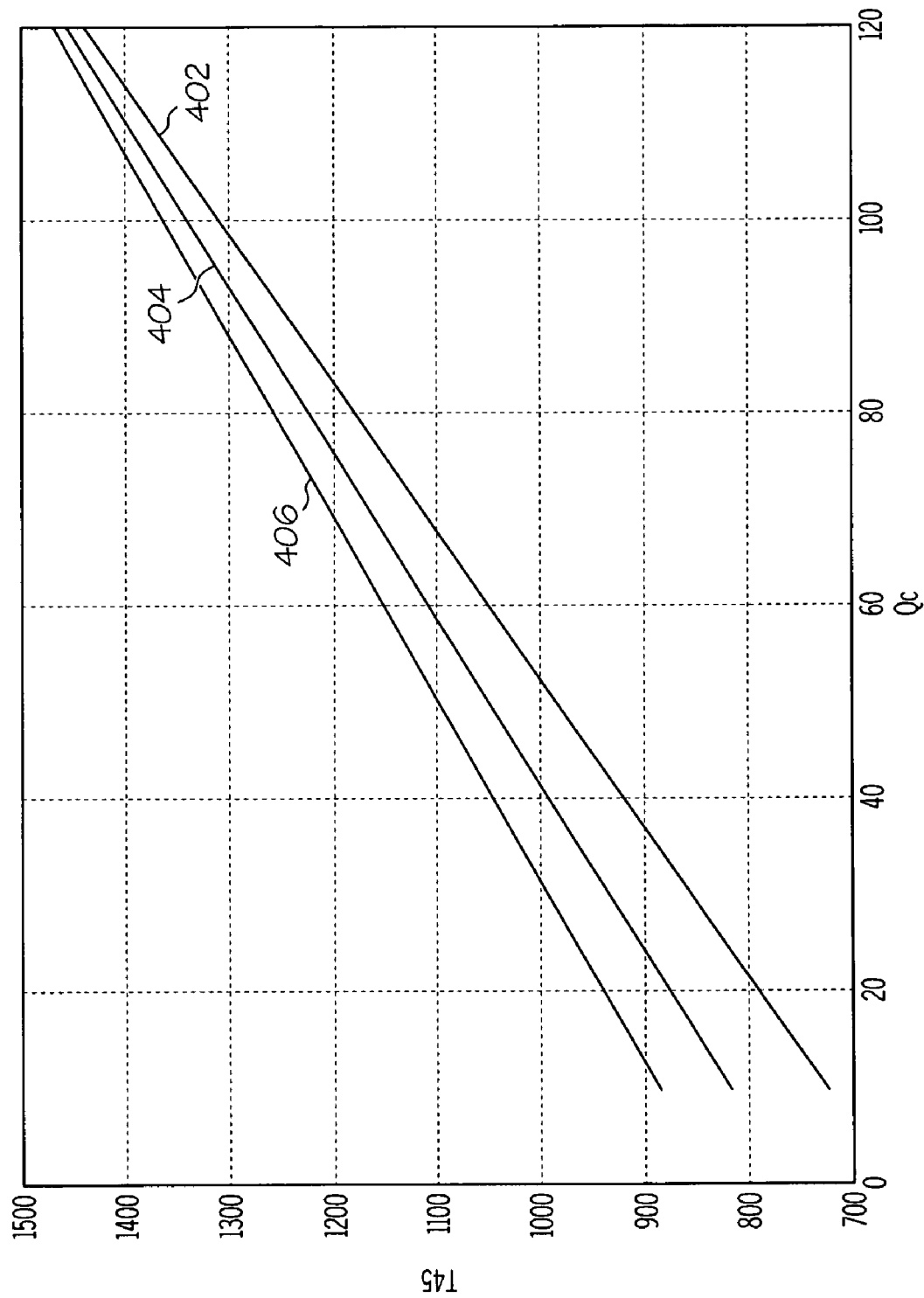
Figure 5D:
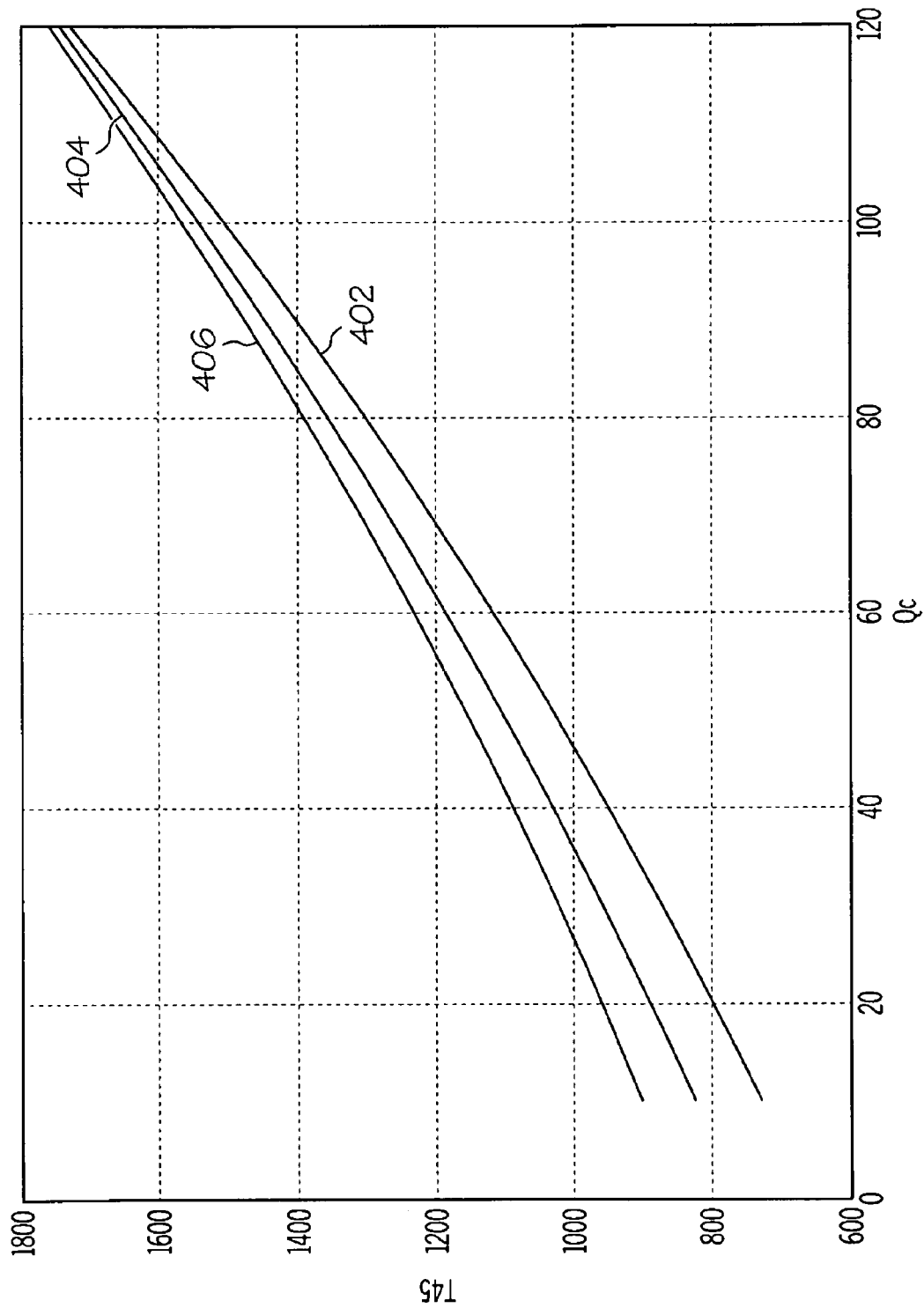

The deterioration model extrapolation method described herein exhibits several advantages. One advantage is that the deterioration model is self-adapting to the specific engine 100 (or other system) based on actual engine (or system) deterioration. An example of this specific advantage may be seen by referring to FIGS. 5A-5D, which depict some examples of different characteristic curves, similar to those depicted in FIG. 4, for different engine (or system) deterioration characteristics. In FIG. 5A, the engine 100 (or system) exhibits linear and parallel deterioration characteristics; in FIG. 5B, the engine 100 (or system) exhibits non-linear and parallel deterioration characteristics; in FIG. 5C, the engine 100 (or system) exhibits linear and non-parallel deterioration characteristics; and in FIG. 5D, the engine 100 (or system) exhibits non-linear and non-parallel deterioration characteristics.

In addition to the above, the deterioration model is self-adapting to the particular operating environment, and continues to provide accurate results if engine performance improves after an engine wash (or other performance-improving system maintenance). Sudden shifts in engine performance, such as those caused by foreign object damage (FOD) on the engine, can be detected relatively quickly without having to wait for steady state conditions to occur. Moreover, unlike conventional extrapolation methodologies, if a sudden shift in engine performance occurs, the accuracy of the T45_MAX calculations is unaffected. This is because with a conventional extrapolation methodology use data before and after a shift are used together.

The estimated T45_MAX calculations for each new compensated engine performance datum are likely to produce relatively noisy results. As a result, and as FIG. 2 further depicts, the estimated T45_MAX calculations are filtered to provide relatively stable, real-time estimates 218. As FIG. 2 also depicts, the filtered T45_MAX calculations are also uncorrected. That is, the theta (θ-correction) and the delta (δ-correction) corrections are undone. The filtered T45_MAX calculations, which are supplied continuously during engine 100 (or system) operation, are then used to provide continuous T45 Margin and continuous power available estimates 222 to a user, such as a pilot. As may be appreciated, the continuous power available estimate is calculated based on the power turbine speed and the torque value at which the extrapolated characteristic curve 406 intersect the T45 limit 414.

Figure 6:
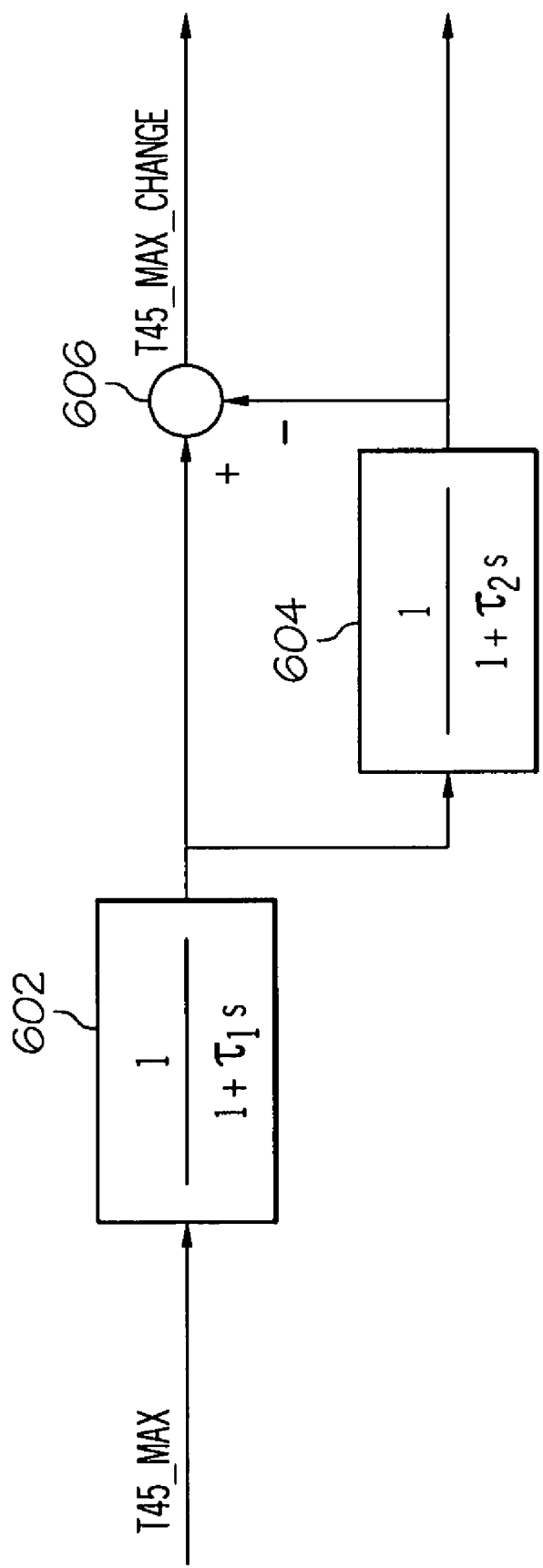
FIG. 6 depicts exemplary filters that may be used to implement the method depicted in FIG. 2.

The manner in which the T45_MAX calculations are filtered may vary, in a particular embodiment, which is depicted in FIG. 6, two first-order filters are used—a first filter 602 and a second filter 604. The time constant ($\tau_1$) of the first filter 602 is such that the first filter 602 has a relatively faster response time than the second filter 604. The output of the first filter 602 is supplied to the second filter 604, which has a time constant ($\tau_2$) that results in a relatively smooth response. Thus, depending upon the type of output desired, either filter 602, 604 may be used to supply the continuous T45 Margin and continuous power available estimates 222.

No matter which filter 602, 604 is used to supply the continuous T45 Margin and continuous power available estimates 222, and as FIG. 6 further depicts, the outputs of each filter 602, 604 are supplied to a comparator 606. The comparator 606 determines a relative change in T45_MAX (e.g., T45_MAX_CHANGE) 608 by computing the difference of the two filter outputs. Such changes may occur, for example, due to sudden changes in engine performance, which may occur as a result of normal deterioration or foreign object damage. Such changes may also result from a faulty or inoperable sensor 124. In any case, referring back to FIG. 2, it is seen that if T45_MAX_CHANGE exceeds a predetermined magnitude 224, then action is taken. It is noted that for convenience, in FIG. 2 the action is depicted as being triggered via a reset signal 226. Nonetheless, the action that is taken is a resetting of the current performance characteristic curve. More specifically, only phase compensated data that are collected after the change is detected will be used for the deterioration model extrapolations of the next flight. Otherwise, the deterioration model extrapolations will be distorted due to using data from both before and after the shift occurred.

The continuous performance analysis method 200 described herein provides various advantages. The method 200 provides true continuous performance analysis, such as continuous power assurance monitoring for an aircraft gas turbine engine, and result updates. The method 200 does not rely on steady state conditions being achieved, and uses nearly all available data to generate and supply robust results. The method 200 provides very consistent results (e.g., 5-10° F. standard deviation), and detects changes very quickly (e.g., a 50° F. shift detected in about 30 seconds). The method 200 implements a very efficient algorithm in terms of processing time and memory requirements. As noted above, it also generates characteristic curves that are self-adapting to the specific engine and the specific operating environment. As a result, overly conservative power assurance results are not produced. Finally, by auto-archiving the characteristic curves for each flight (or specific system operational cycle), trending and PHM analyses are more convenient to perform, and it is easier to isolate and discard bad data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of conducting a continuous performance analysis for a system, comprising the steps of:
collecting transient performance data for a first parameter of the system and a second parameter of the system using a first sensor and a second sensor, respectively;
supplying the transient performance data to a processor; and
applying transfer functions to the transient performance data for at least one of the first and second parameters, in the processor, to thereby generate phase compensated performance data representative of a steady state relationship between the first and second parameters; and
for each phase compensated performance datum, calculating, in the processor, an estimate of the first parameter at a predetermined value of the second parameter using the phase compensated performance datum and a previously stored performance characteristic curve representative of the steady state relationship between the first and second parameters.

2. The method of claim 1, wherein:
the predetermined value of the second parameter is a predetermined maximum rated value of the second parameter; and
the calculated estimate of the first parameter is a calculated estimate of a maximum value of the first value at the predetermined maximum rated value of the second parameter.

3. The method of claim 2, further comprising:
subtracting, in the processor, the maximum value of the first value from a predetermined first parameter limit value to obtain a first parameter margin.

4. The method of claim 1, further comprising:
filtering, in the processor, each of the calculated estimates of the first parameter to generate filtered first parameter estimate values.

5. The method of claim 4, further comprising:
detecting, in the processor, whether the filtered first parameter estimate values have changed by a predetermined magnitude; and
generating, in the processor, a reset signal if the filtered first parameter estimate values have changed by the predetermined magnitude.

6. The method of claim 1, further comprising:
providing, in a memory a predetermined number of data storage bins, each data storage bin representative of a predefined value range of the second parameter; and
storing, in the memory, the phase compensated performance data in an appropriate one of the data storage bins.

7. The method of claim 6, wherein:
the second parameter ranges in value from 1% to 130%; and
the predefined value range of each data storage bin is 1%, thereby resulting in 130 storage bins being provided.

8. The method of claim 6, further comprising:
generating, in the processor, a performance characteristic curve from the phase compensated performance data stored in each of the data storage bins.

9. The method of claim 8, further comprising:
recursively calculating, in the processor, a mean and a standard deviation of the phase compensated performance data stored in each of the data storage bins; and
generating, in the processor, the performance characteristic curve using the recursively calculated mean and standard deviation values.

10. The method of claim 1, further comprising:
filtering, in the processor, each of the calculated estimates of the first parameter to generate filtered first parameter estimate values;
detecting, in the processor, whether the filtered first parameter estimate values have changed by a predetermined magnitude; and
if the filtered first parameter estimate values have changed by the predetermined magnitude, generating, in the processor, the performance characteristic curve from the phase compensated performance data stored in each of the data storage bins after determining that the filtered first parameter estimate values have changed by the predetermined magnitude.

11. A method of conducting a continuous performance analysis for a gas turbine engine, comprising the steps of:
collecting transient performance data for a first engine parameter and a second engine parameter using a first sensor and a second sensor, respectively;
supplying the transient performance data to a processor; and
applying transfer functions to the transient performance data for at least one of the first and second engine parameters, in the processor, to thereby generate phase compensated engine performance data representative of a steady state relationship between the first and second engine parameters; and
for each phase compensated engine performance datum, calculating, in the processor, an estimate of the first engine parameter at a predetermined value of the second engine parameter using the phase compensated engine performance datum and a previously stored performance characteristic curve representative of the steady state relationship between the first and second engine parameters.

12. The method of claim 11, wherein:
the first engine parameter is power turbine inlet temperature;
the second engine parameter is engine torque;
the predetermined value of the second engine parameter is maximum rated power torque; and
the calculated estimate of the first engine parameter is a calculated estimate of power turbine inlet temperature at the maximum rated power torque.

13. The method of claim 12, further comprising:
providing, in a memory a predetermined number of data storage bins, each data storage bin representative of a predefined value range of engine torque; and
storing, in the memory, the phase compensated performance data in an appropriate one of the data storage bins.

14. The method of claim 13, wherein:
the engine torque ranges in value from 1% to 130%; and
the predefined value range of each data storage bin is 1%, thereby resulting in 130 storage bins being provided.

15. The method of claim 13, further comprising:
generating, in the processor, a performance characteristic curve from the phase compensated performance data stored in each of the data storage bins.

16. The method of claim 15, further comprising:
recursively calculating, in the processor, a mean and a standard deviation of the phase compensated performance data stored in each of the data storage bins; and
generating, in the processor, the performance characteristic curve using the recursively calculated mean and standard deviation values.

17. The method of claim 12, further comprising:
filtering, in the processor, each of the calculated estimates of the power turbine inlet temperature at the maximum rated power to generate filtered maximum power inlet temperature data;
detecting, in the processor, whether the filtered maximum power inlet temperature data change a predetermined magnitude; and
generating, in the processor, a reset signal if the filtered maximum power inlet temperature data change the predetermined magnitude.

18. The method of claim 12, further comprising:
calculating, in the processor, power turbine inlet temperature margin from a predetermined power turbine inlet temperature limit value and the calculated estimate of power turbine inlet temperature at the maximum rated power torque; and
calculating, in the processor, power available from the engine.

19. A gas turbine engine continuous performance analysis system, comprising:
a first sensor operable to sense a first engine parameter and supply first transient performance data representative of the first engine parameter;
a second sensor operable to sense a second engine parameter and supply second transient performance data representative of the second engine parameter;
a processor coupled to receive the first and second transient performance data from the first and second sensors, respectively, the processor operable, upon receipt thereof, to:
apply transfer functions to at least one of the first and second transient performance data to thereby generate phase compensated engine performance data representative of a steady state relationship between the first and second engine parameters; and
for each phase compensated engine performance datum, calculating an estimate of the first engine parameter at a predetermined value of the second engine parameter using the phase compensated engine performance datum and a previously stored performance characteristic curve representative of the steady state relationship between the first and second engine parameters.

20. The system of claim 19, wherein:
the first engine parameter is power turbine inlet temperature;
the second engine parameter is engine torque;
the predetermined value of the second engine parameter is maximum rated power torque; and
the calculated estimate of the first engine parameter is a calculated estimate of power turbine inlet temperature at the maximum rated power torque.

\* \* \* \* \*

UNITED STATES PATENT AND TRADEMARK OFFICE
CERTIFICATE OF CORRECTION

PATENT NO.       : 8,068,997 B2                                Page 1 of 1
APPLICATION NO.  : 12/367182
DATED            : November 29, 2011
INVENTOR(S)      : Ling et al.

It is certified that error appears in the above-identified patent and that said Letters Patent is hereby corrected as shown below:

On the Title Page of the Patent, under Item (75) Inventors:

Stramiello, Mesa, AZ (US); Larry "Lee", should be changed to

Stramiello, Mesa, AZ (US); Larry --Yee--,

Signed and Sealed this
Third Day of April, 2012

David J. Kappos
*Director of the United States Patent and Trademark Office*